United States Patent
Ozeki

(10) Patent No.: US 9,747,517 B2
(45) Date of Patent: Aug. 29, 2017

(54) IMAGE PROCESSING APPARATUS, IMAGE PROCESSING METHOD AND RECORDING MEDIUM STORING IMAGE PROCESSING PROGRAM

(71) Applicant: FUJIFILM Corporation, Tokyo (JP)

(72) Inventor: Masami Ozeki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/179,088

(22) Filed: Jun. 10, 2016

(65) Prior Publication Data

US 2017/0083784 A1    Mar. 23, 2017

(30) Foreign Application Priority Data

Sep. 18, 2015  (JP) ................. 2015-185893

(51) Int. Cl.
*G06K 9/46*   (2006.01)
*G06K 9/62*   (2006.01)
*G06F 17/30*  (2006.01)

(52) U.S. Cl.
CPC ..... *G06K 9/4671* (2013.01); *G06F 17/30268* (2013.01); *G06K 9/6267* (2013.01)

(58) Field of Classification Search
CPC ........... G06K 9/00463; G06K 9/00449; G06K 9/00456; G06K 9/00469; G06K 9/4671; G06K 9/6267; G06F 17/30268
See application file for complete search history.

(56) References Cited

U.S. PATENT DOCUMENTS 9,304,993 B2 * 4/2016 Roman ............ G06F 17/30011

FOREIGN PATENT DOCUMENTS

| JP | H05-94418 A    | 4/1993  |
|----|---------------|---------|
| JP | 2003-234916 A | 8/2003  |
| JP | 2005-182196 A | 7/2005  |
| JP | 3922298 B2    | 5/2007  |
| JP | 2011-221989 A | 11/2011 |
| JP | 2012-134775 A | 7/2012  |

* cited by examiner

*Primary Examiner* — Duy M Dang
(74) *Attorney, Agent, or Firm* — Studebaker & Brackett PC

(57) ABSTRACT

Provided are an image processing apparatus, as well as an image processing method and recording medium storing image processing program, in which it is possible to ascertain the number of times a particular kind of processing has been implemented with regard to an image. To achieve this, an image is analyzed and tag information possessed by the image is acquired. Processing content corresponding to the acquired image tag information is read from an image processing table. Processing defined by the read processing content is implemented with regard to the image and the number of implementations of this processing is increased. The processed image is displayed.

14 Claims, 9 Drawing Sheets

*Fig. 2*

| TAG SPECIFYING INFORMATION (SECOND TAG SPECIFYING INFORMATION) | TAG INFORMATION | PROCESSING CONTENT | NUMBER OF IMPLEMENTATIONS | UPDATE DATE AND TIME |
|---|---|---|---|---|
| ID1 | RUN | AFTERIMAGE | 5 (6) | --- |
| ID2 | JOY | RAISE LIGHTNESS | 4 | --- |
| ID3 | LAUGH | RAISE LIGHTNESS | 3 | --- |
| ID4 | SORROW | LOWER LIGHTNESS | 2 | --- |
| ID5 | SORROW | AFTERIMAGE | 1 | --- |

*Fig. 8*

| TAG SPECIFYING INFORMATION (SECOND TAG SPECIFYING INFORMATION) | TAG INFORMATION | PROCESSING CONTENT | NUMBER OF IMPLEMENTATIONS | UPDATE DATE AND TIME |
|---|---|---|---|---|
| ID1 | RUN | AFTERIMAGE | 5 (6) | --- |
| ID2 | JOY | RAISE LIGHTNESS | 4 | --- |
| ID3 | LAUGH | RAISE LIGHTNESS | 3 | --- |
| ID4 | SORROW | LOWER LIGHTNESS | 2 | --- |
| ID5 | SORROW | AFTERIMAGE | 1 | --- |
| ID6 | RUN | RAISE LIGHTNESS | 2 (1) | --- |

IMAGE PROCESSING APPARATUS, IMAGE PROCESSING METHOD AND RECORDING MEDIUM STORING IMAGE PROCESSING PROGRAM

CROSS-REFERENCE TO RELATED APPLICATIONS

The present invention claims priority under 35 U.S.C. §119 to Japanese Patent Application No. 2015-185893 filed Sep. 18, 2015. Each of the above application(s) is hereby expressly incorporated by reference, in its entirety, into the present application.

BACKGROUND OF THE INVENTION

Field of the Invention

This invention relates to an image processing apparatus, image processing method and recording medium storing an image processing program.

Description of the Related Art

In the field of image search, consideration has been given to systems in which queries can be made more detailed by using adverbs and declinable words in addition to nouns as image-search keywords (Patent Document 1). Further, in the field of image processing, there is a system in which a keyword is designated from a list prepared in advanced and image processing is executed based upon the designated keyword (Patent Document 2), and a system in which image processing is executed based upon comment data that has been appended to an image (Patent Document 3).

Furthermore, there is a system in which an image processing apparatus acquires a main subject image and a background image and generates a new image from at least one of these images (Patent Document 4), and a system in which an image processing apparatus changes the motion pattern of a character superimposed on an image (Patent Document 5). Further, there is a system involving a slideshow in which a display effect is selected from among predetermined display effects and an image is changed in the manner of a time series based upon the display effect selected (Patent Document 6).

Patent Document 1: Japanese Patent Application Laid-Open No. 05-94478
Patent Document 2: Japanese Patent Application Laid-Open No. 2003-234916
Patent Document 3: Japanese Patent No. 3922298
Patent Document 4: Japanese Patent Application Laid-Open No. 2012-134775
Patent Document 5: Japanese Patent Application Laid-Open No. 2011-221989
Patent Document 6: Japanese Patent Application Laid-Open No. 2005-182196

According to Patent Document 2, image processing is executed based upon keywords, and in Patent Document 3, image processing is merely executed based upon comment data appended to an image. In both of these patent documents, no consideration is given to ascertaining the number of times a particular kind of processing has been implemented with regard to an image in a case where image processing has been executed based upon tag information.

SUMMARY OF THE INVENTION

An object of the present invention is to arrange it so that, in a case where image processing has been executed based upon tag information, the number of times a particular kind of processing has been implemented with regard to an image is ascertained.

An image processing apparatus according to the present invention comprises: a tag specifying information acquisition unit (tag specifying information acquisition means) for acquiring first tag specifying information that specifies tag information of an image; a first image processing unit (first image processing means) for acquiring, from among items of second tag specifying information from an image processing table that stipulates a plurality of corresponding relationships each of which is a corresponding relationship among three items which are second tag specifying information, processing content that defines processing to be applied to the image and number of implementations of processing of the processing content, second tag specifying information that matches the first tag specifying information acquired by the tag specifying information acquisition unit, reading processing content, which corresponds to the acquired second tag specifying information, from the image processing table, and subjecting the image to processing defined by the read processing content; and a first implementation-count increasing unit (first implementation-count increasing means) for increasing, from among the numbers of implementations stipulated in the image processing table, the number of implementations corresponding to the processing content that defines the processing implemented by the first image processing unit.

The present invention provides also an image processing method. Specifically, the method comprises steps of: a tag specifying information acquisition unit acquiring first tag specifying information that specifies tag information of an image; a first image processing unit acquiring, from among items of second tag specifying information from an image processing table that stipulates a plurality of corresponding relationships each of which is a corresponding relationship among three items which are second tag specifying information, processing content that defines processing to be applied to the image and number of implementations of processing of the processing content, second tag specifying information that matches the first tag specifying information acquired by the tag specifying information acquisition unit, reading processing content, which corresponds to the acquired second tag specifying information, from the image processing table, and subjecting the image to processing defined by the read processing content; and a first implementation-count increasing unit increasing, from among the numbers of implementations stipulated in the image processing table, the number of implementations corresponding to the processing content that defines the processing implemented by the first image processing unit.

The present invention further provides a recording medium storing a program for controlling a computer of an image processing apparatus.

The image processing apparatus may further comprise a display control unit (display control means) for displaying the image, which has been subjected to processing by the first image processing unit, on a display screen of a display device.

The image processing apparatus may further comprise: a processing content acceptance unit (processing content acceptance means) for accepting the processing content from a user; a second image processing unit (second image processing means) for subjecting the image to the processing content accepted by the processing content acceptance unit; and a second implementation-count increasing unit (second implementation-count increasing means) for increasing, from among the numbers of implementations stipulated in the image processing table, the number of implementations corresponding to the processing content that defines the processing executed by the second image processing unit. The first image processing unit and the second image processing unit may be the same unit or different units. Further, the first implementation-count increasing unit and the second implementation-count increasing unit may be the same unit or different units.

For example, the second implementation-count increasing unit increases the number of implementations by a count greater than that performed by the first implementation-count increasing unit.

The image processing apparatus may further comprise: a processing cancellation unit (processing cancellation means) for restoring the image, which has been subjected to processing by the first image processing unit, to the image that prevailed before implementation of this processing, in response to acceptance of the processing content by the processing content acceptance unit; and an implementation-count decreasing unit (implementation-count decreasing means) for decreasing number of implementations corresponding to processing content that defines processing that was applied to the image restored by the processing cancellation unit to the image that prevailed before implementation of processing.

By way of example, in a case where the image processing table contains multiple items of processing content corresponding to the acquired second tag specifying information, the first image processing unit acquires processing content having a high number of implementations and subjects the image to processing defined by the acquired processing content.

By way of example, the tag specifying information acquisition unit acquires area specifying information, which specifies an area to be subjected to processing defined by the processing content, in correspondence with the first tag specifying information. In this case, the first image processing unit subjects the image to the processing defined by the read processing content, this processing being applied to the area specified by the area specifying information.

By way of example, in a case where the second tag specifying information that matches the acquired first tag specifying information could not be acquired from the image processing table, the processing content acceptance unit accepts the processing content.

The apparatus may further comprise an image processing table updating unit (image processing table updating means) which, in a case where processing content accepted by the processing content acceptance unit has not been stipulated in the image processing table, is for stipulating the accepted processing content in the image processing table in correspondence with new second tag specifying information or tag specifying information acquired by the tag specifying information acceptance unit.

Preferably, tag information specified by the new second tag specifying information is stipulated in the following order: expression in the form of a verb, expression in the form of an adjective, and expression in the form of a noun.

The apparatus may further comprise a maximum-number acceptance unit for accepting input of a maximum number of images, which are to be subjected to the processing defined by the processing content, from among a plurality of images. In this case, from among items of first tag specifying information acquired by the tag specifying information acquisition unit with regard to each of the plurality of images, the first image processing unit subjects the maximum number of images that have been input from the maximum-number input unit to processing, which is defined by the read processing content from among the multiple items of processing content that correspond to multiple items of second tag specifying information, in order of decreasing number of implementations.

In a case where the image processing table contains multiple items of processing content corresponding to second tag information, which matches the first tag specifying information, from among the items of second tag information, the first image processing unit may read processing content having the latest update date and time from among the multiple items of processing content.

In accordance with the present invention, tag specifying information specifying tag information of an image is acquired. Processing content corresponding to the acquired tag specifying information is read from an image processing table that stipulates a corresponding relationship among tag specifying information, processing content that defines processing to be applied to the image and number of implementations of processing of the processing content. The image is subjected to processing defined by the read processing content. The number of implementations corresponding to the processing content that defines the processing implemented is increased. It is possible to ascertain the number of implementations of the processing of the image executed based upon the tag specifying information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is an example of an image processing table;

FIG. 8 is an example of an image processing table;

DESCRIPTION OF THE PREFERRED EMBODIMENTS

Preferred embodiments of the present invention will now be described in detail with reference to the accompanying drawings.

Figure 1:
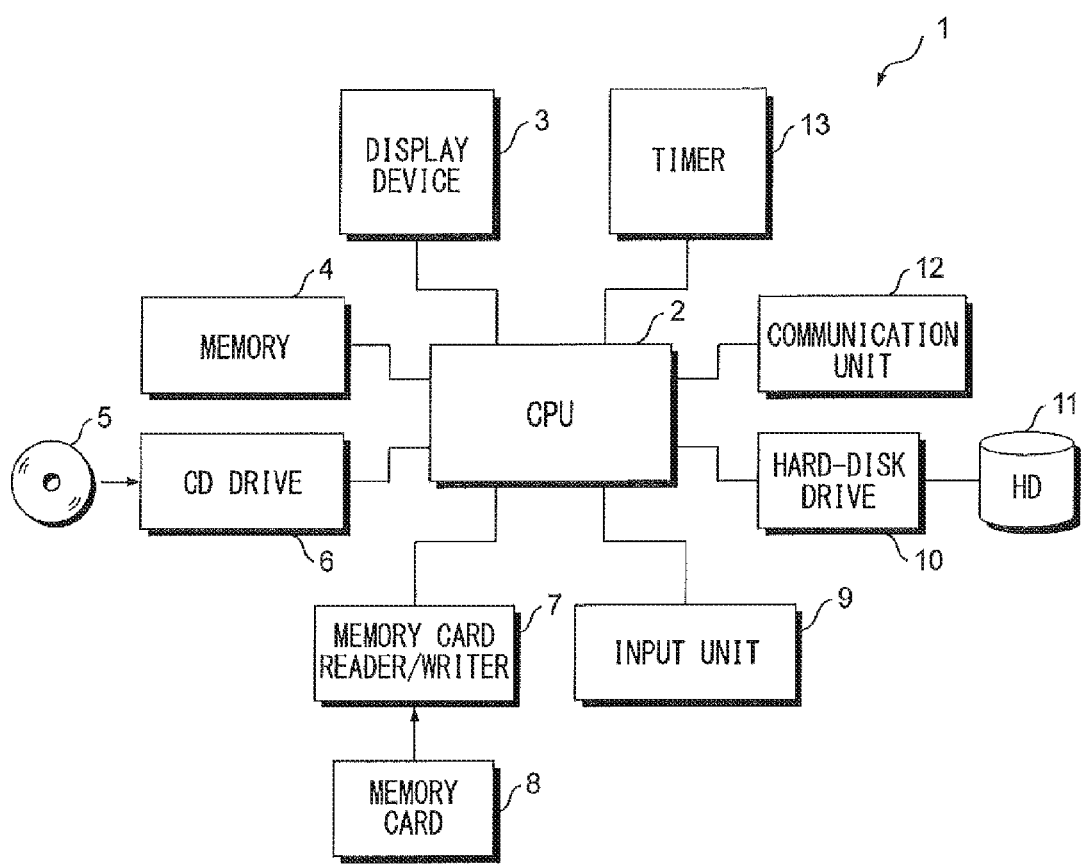
FIG. 1 is a block diagram illustrating the electrical configuration of an image processing apparatus.

FIG. 1 illustrates an embodiment of the present invention and shows the electrical configuration of an image processing apparatus 1.

The overall operation of the image processing apparatus 1 is controlled by a CPU (Central Processing Unit) 2.

The image processing apparatus 1 includes a display device 3 for displaying an image, which has undergone image processing, on a display screen, a memory 4 storing data and the like, and a CD (Compact Disc) drive 6 for accessing data and the like recorded on the compact disc 5. The image processing apparatus 1 further includes a memory card reader/writer 7 for reading an image file from a memory card 8, which stores image files representing images, and recording the image file on the memory card 8, and an input unit 9 for applying various commands to the image processing apparatus 1. The image processing apparatus 1 further includes a hard disk 11, a hard-disk drive 10 for accessing the hard disk 11, a communication unit 12 for communicating with another computer or the like, and a timer 13.

When the memory card 8 is loaded in the image processing apparatus 1 and an image file is read by the memory card reader/writer 7, an image represented by the read image file is subjected to image processing based upon tag information. In a case where an image has been stored not on the memory card 8 but on the compact disc 5 or on some other medium, the image that has been stored on the disk or other medium is read and subjected to image processing. The image processing apparatus 1 would be provided with a reading device suitable for reading images stored on media. Further, in a case where an image is applied to the image processing apparatus 1 via a network such as the Internet, the image is received by the communication unit 12 and the received image is applied to and stored in the memory 4. Image processing is applied to the image thus stored.

The compact disc 5 (recording medium) contains a program readable by the CPU 2 (computer) of the image processing apparatus 1 for controlling processing described later. By loading the compact disc 5 in the image processing apparatus 1, the program stored on the compact disc 5 is installed in the image processing apparatus 1. The program may be transmitted to the image processing apparatus 1 via a network such as the Internet. The program is received by the communication unit 12 and the received program is installed in the image processing apparatus 1.

FIG. 2 is an example of an image processing table.

The image processing table contains the following in correspondence with tag specifying information (second tag specifying information): image tag information, processing content which stipulates processing with respect to the image, number of implementations of the processing stipulated by the processing content, and update date and time. It will suffice if the image processing table stipulates a plurality of corresponding relationships among at least the three following items: the tag specifying information (second tag specifying information), the processing content which stipulates processing with respect to the image, and the number of implementations of the processing stipulated by the processing content. The image processing table has been stored in the memory 4 of the image processing apparatus 1. The tag specifying information may be data that is capable of specifying tag information; the specifying information shown in FIG. 2 is identification data that identifies the tag information. The tag information per se may be the tag specifying information. Further, the image processing table is updated when, for example, processing stipulated by processing content has been implemented with regard to an image, and the update date and time (read from the timer 13) is stored in the image processing table by such updating. However, the data indicating update date and time need not necessarily be stored in the image processing table.

Figure 3:
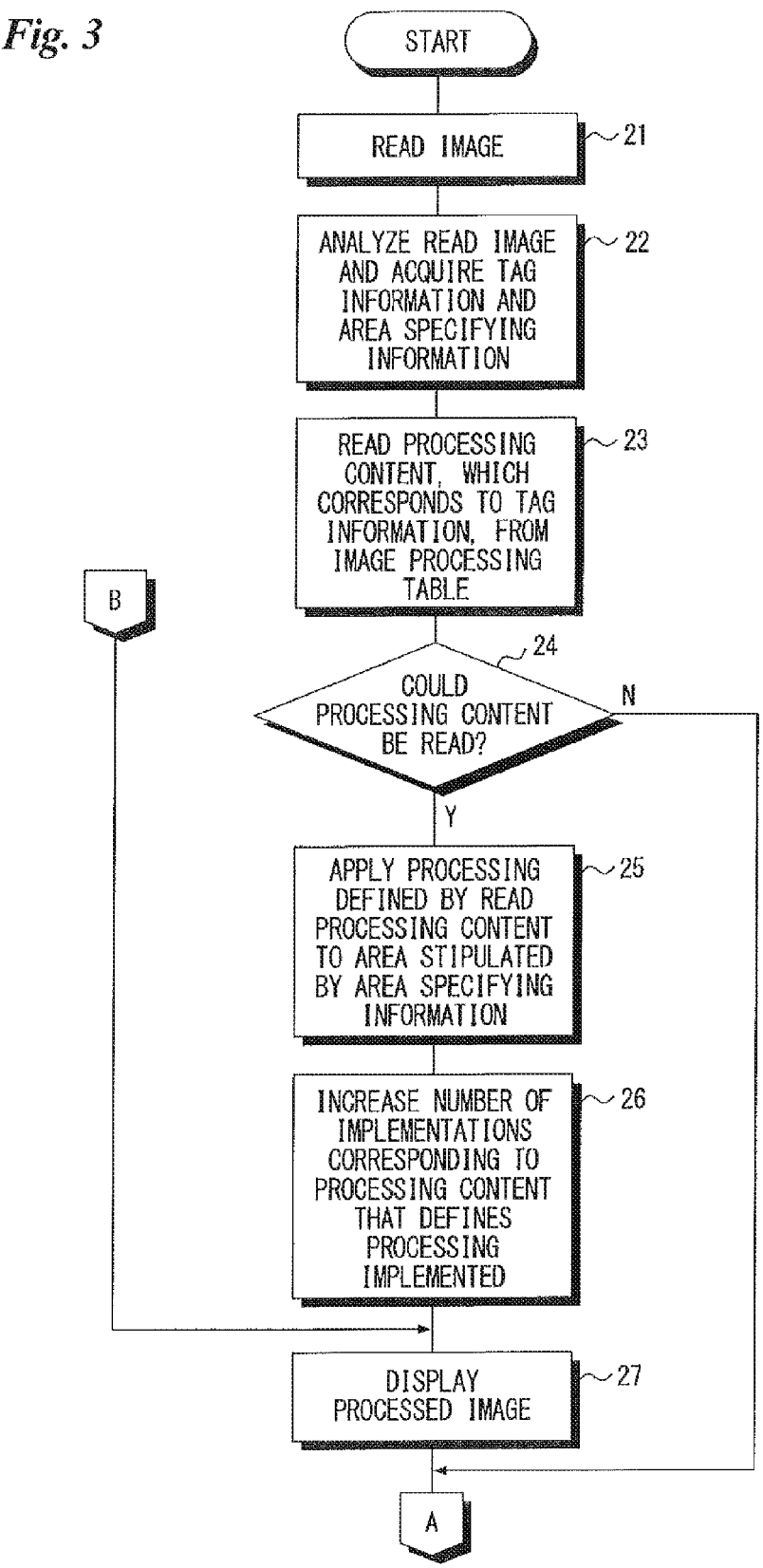
FIGS. 3 and 4 are flowcharts illustrating processing executed by the image processing apparatus.
Figure 4:
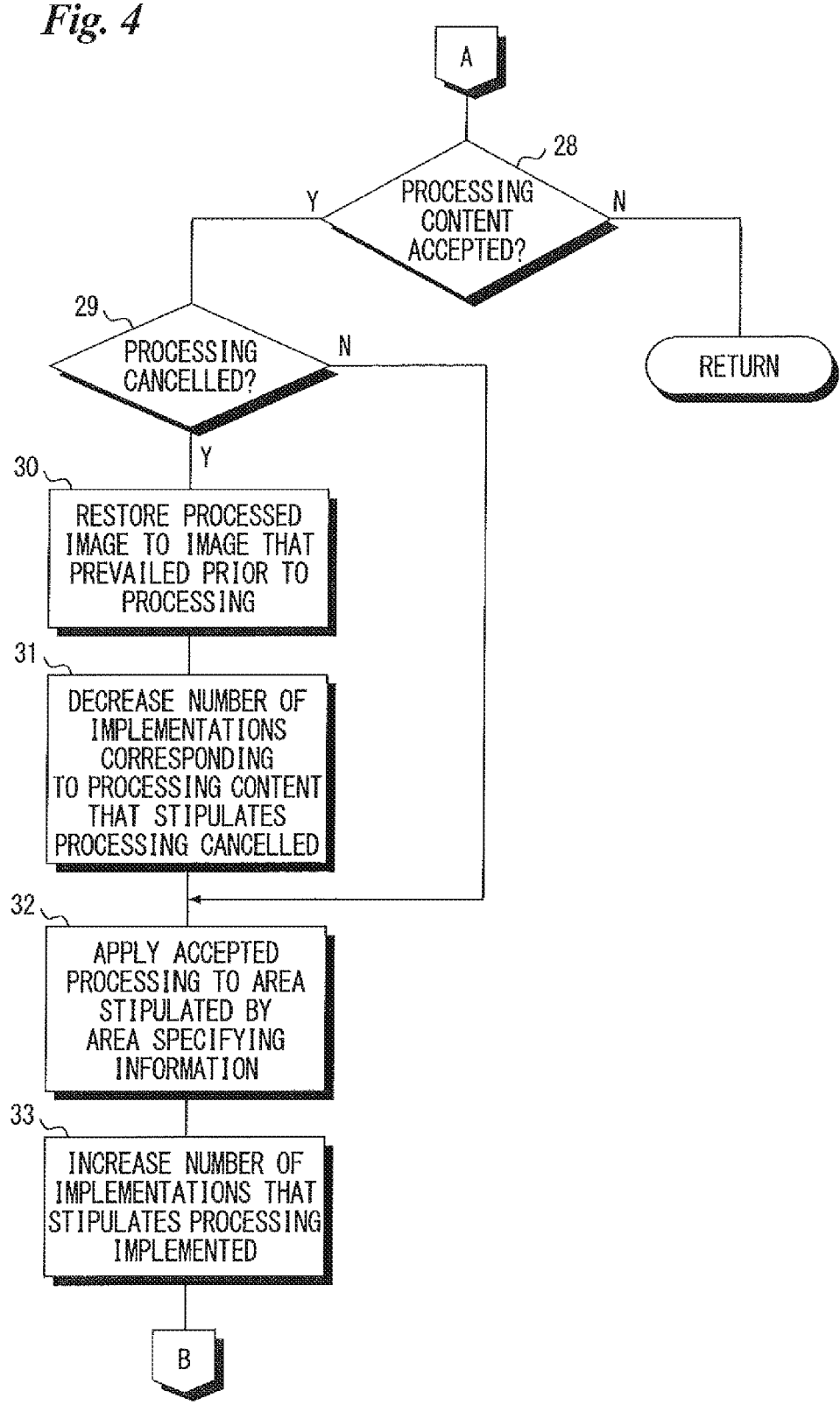

FIGS. 3 and 4 are flowcharts illustrating processing executed by the image processing apparatus 1.

When the memory card 8 is loaded in the memory card reader/writer 7 of the image processing apparatus 1, an image (image file) that has been stored on the memory card 8 is read (step 21). The read image is analyzed by the CPU 2 (step 22). As a result of this image analysis, the CPU 2 (tag specifying information acquisition unit) acquires the tag information (first tag specifying information) of the read image as well as area specifying information. The image analysis makes use of an image analyzing program generated in such a manner that image analysis is executed with regard to a number of images to which tag information has been appended in advance, and tag information obtained from the result of this analysis and tag information that has been appended in advance will match. By performing image analysis using such an image analyzing program, the CPU 2 acquires image tag information (first tag information) regarding the read image. Further, a main subject included in the read image is detected by the CPU 2, and information specifying an area that surrounds the main subject is acquired by the CPU 2 as the area specifying information. Of course, in a case where at least one of tag specifying information (the first tag specifying information) or tag information (first tag specifying information) has been stored in the header of the image file, at least one of the tag specifying information or tag information is read by the CPU 2. In such case image analysis is not necessarily required. Further, in a case where area specifying information has been stored in the header of the image file, the area specifying information that corresponds to the tag specifying information will be acquired by the CPU 2 by reading the area specifying information from the header. Accordingly, the area specifying information need not necessarily be acquired by performing image analysis.

Figure 5:
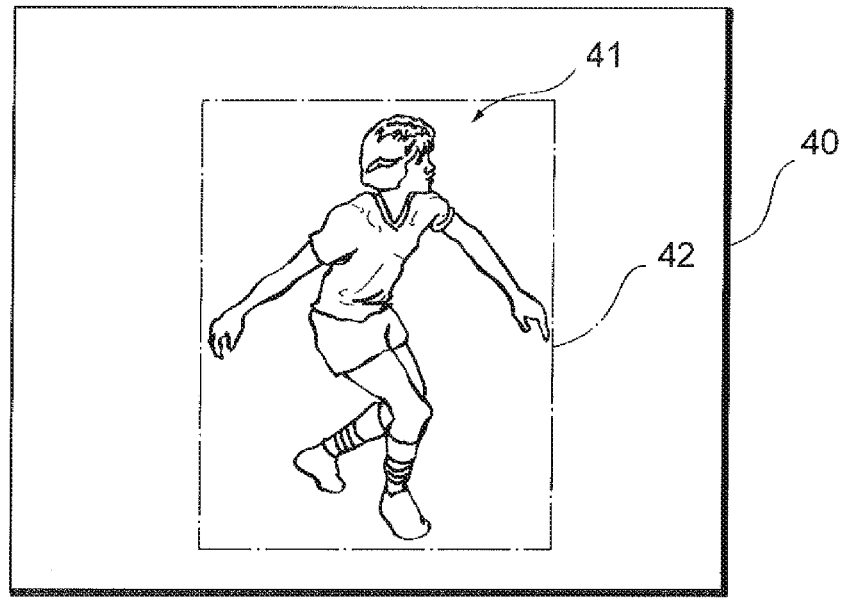
FIGS. 5 through 7 are examples of images.

FIG. 5 is an example of an image 40 that has been read.

The image 40 is that of a child 41 playing soccer, in which the main subject is the child 41. When the manner in which the child 41 is playing soccer is analyzed by the CPU 2, tag information (first tag specifying information) to the effect that the child is running, namely "RUN", is acquired from the image 40 by the CPU 2. Further, an area surrounding the child 41 is stipulated by the CPU 2 as an image processing target area 42 in which image processing will be implemented by the CPU 2. Area specifying information that specifies the image processing target area 42 (e.g., coordinate information of the image processing target area 42 in the image 40) is acquired by the CPU 2.

When the tag information (first tag specifying information) regarding the image 40 as well as the area specifying information is acquired by the CPU 2 [tag specifying information (first tag specifying information) that specifies the tag information may just as well be acquired instead of the tag information], tag specifying information (second tag specifying information) that matches the tag information (first tag specifying information) acquired from the image 40 is acquired by the CPU 2 from among the tag specifying information (second tag specifying information) stipulated in the image processing table of FIG. 2, and processing content corresponding to the acquired tag specifying information (second tag specifying information) is read from the image processing table (step 23). The tag information (first tag specifying information) that has been acquired from the image 40 is "RUN". Tag specifying information (second tag specifying information) ID1 that matches "RUN" is acquired by the CPU 2 as tag information, and processing content indicative of "AFTERIMAGE" is acquired by the CPU 2 from the image processing table as processing content that corresponds to the acquired tag specifying information ID1. Since the tag information (first tag specifying information) "RUN" has been acquired from the image 40, "RUN", which is the tag information (second tag information) that matches the tag information acquired from the image 40, may be acquired from the image processing table as well, and the processing content "AFTERIMAGE" may be acquired by the CPU 2 as the processing content that corresponds to the acquired tag information "RUN".

When the processing content corresponding to the tag specifying information (second tag specifying information) that matches the tag information (first tag specifying information) acquired from the image 40 is read from the image processing table ("YES" at step 24), afterimage processing is applied to the image processing target area 42 of the image 40 by the CPU 2 (step 25). By way of example, the afterimage processing subjects the portion of the image of child 41 contained in the image processing target area 42 to blurring that flows in the horizontal direction.

Figure 6:
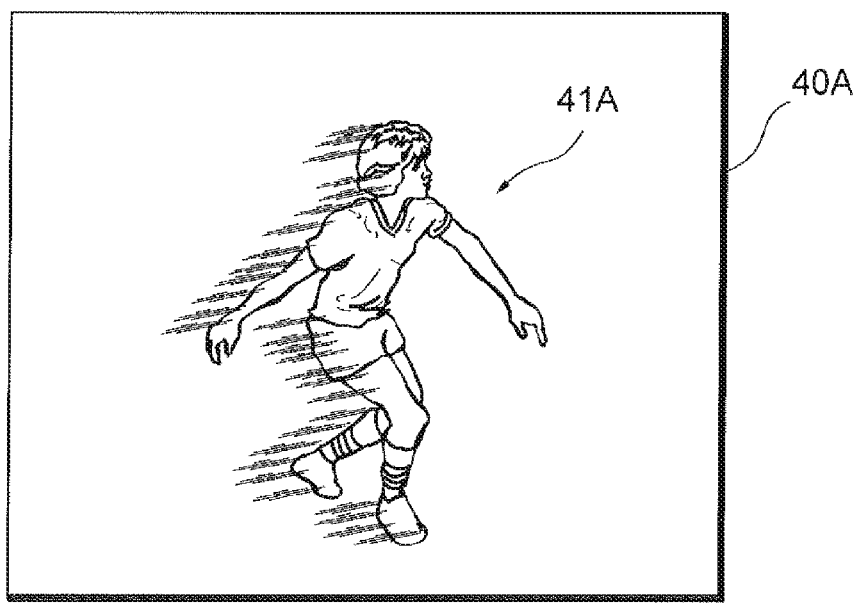

FIG. 6 is an example of an image 40A that has been subjected to this image processing.

Child 41A, which has been subjected to afterimage processing, is represented in the image 40A. An actual sense of motion is conveyed by the child 41A so that the image 40A gives the impression of activity.

With reference again to FIG. 3, when the image processing corresponding to the acquired processing content is implemented, the number of implementations corresponding to the processing content implemented is increased by 1 (though the increase is not limited to 1) by the CPU 2 (first implementation-count increasing unit) (step 26). In a case where the number of implementations of the afterimage processing is five thus far, the number of implementations regarding the afterimage processing will change from five to six by executing the afterimage processing. The number of implementations of image processing will be understood from the image processing table. It can be construed that image processing for which the number of implementations is large is suited to the image having the feature specified by the tag information. Therefore, by applying image processing for which the number of implementations is large to an image having the feature specified by the tag information, image processing that is optimum for the image can be implemented. Further, since the number of implementations is updated, the update date and time corresponding to the tag information "RUN" is updated by the CPU 2.

The image 40A that has been subjected to image processing is displayed on the display screen of the display device 3 by the CPU 2 (display control unit) (step 26).

In a case where processing content corresponding to the tag information (second tag information) that matches the tag information (first tag specifying information) acquired from the image 40 could not be read from the image processing table ("NO" at step 24), processing from step 25 to step 27 is skipped.

In a case where the user views and does not like the image 40A displayed on the display screen or the processing content corresponding to the tag specifying information (second tag specifying information) that matches the tag information (first tag specifying information) acquired from the image 40 is not read from the image processing table ("NO" at step 24), the user inputs the processing content preferred by the user to the image processing apparatus 1. If the user views and likes the image 40A displayed on the display screen or processing content entered by the user is not accepted by the image processing apparatus 1 ("NO" at step 28), processing in the image processing apparatus 1 ends. If the processing content entered by the user is accepted by the image processing apparatus 1 ("YES" at step 28), it is determined whether cancellation of processing has been input to the image processing apparatus 1 (step 29).

Even if an image that has undergone image processing is not to the liking of the user, there is a case where already implemented image processing is cancelled and a case where other image processing is executed further without canceling the already implemented processing. It is for this reason that the determination is made as to whether cancellation of processing content has been input to the image processing apparatus 1. If cancellation of processing content has been input to the image processing apparatus 1 ("YES" at step 29), the already implemented image processing is cancelled by the CPU 2 (processing cancellation unit) and the image that prevailed prior to image processing is restored (step 30). If cancellation of processing is performed, the image 40A shown in FIG. 6 returns to the image 40 shown in FIG. 5. When image processing is cancelled, the number of implementations that was increased in accordance with this processing content is decreased by the CPU 2 (implementation-count decreasing unit) so that the number of implementations is restored to that which prevailed prior to image processing. If this is the case, then the number of implementations that was increased to six is restored to five. If cancellation of processing content has not been input to the image processing apparatus 1 ("NO" at step 29), the processing of steps 30 and 31 is skipped.

The processing entered by the user from the input unit 9 (processing content acceptance unit) and accepted by the image processing apparatus 1 is implemented by the CPU 2 (second image processing unit) with respect to the area defined by the area specifying information (step 32). It may be arranged so that the acceptance of the input from the user is carried out in a case where the tag specifying information (second tag information) that matches the tag information (first tag information) acquired from the image could not be acquired from the image processing table and, as a consequence, processing content corresponding to the tag specifying information (second tag specifying information) contained in the image processing table could not be read from the image processing table.

Figure 7:
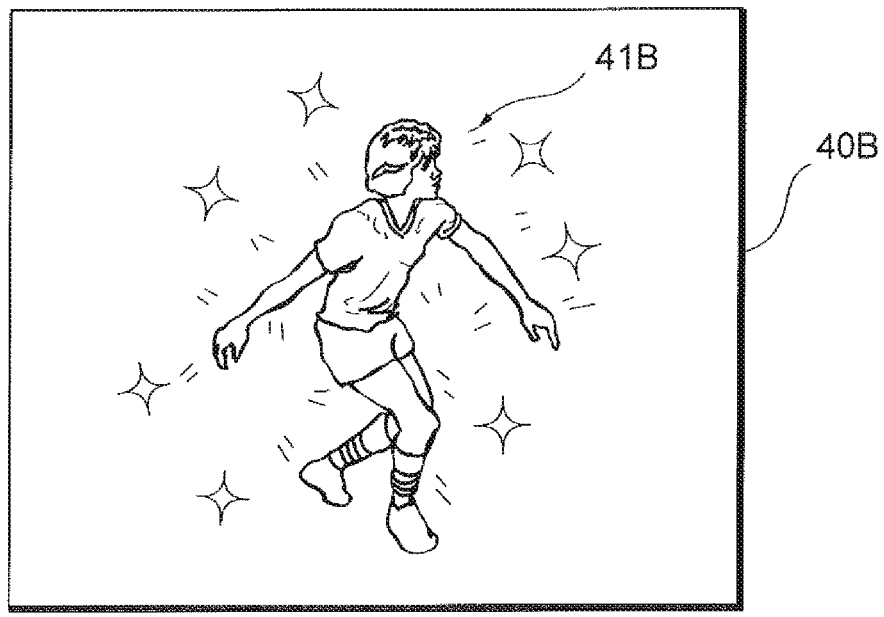

FIG. 7 is an example of an image 40B that has been subjected to processing entered by the user and accepted by the image processing apparatus 1.

For example, assume that the processing entered by the user is an increase in lightness. If processing content has been cancelled by the user, the CPU 2 subjects the image processing target area 42 of the image 40 shown in FIG. 5 to processing that will raise the lightness of the area. As a result, child 41B becomes lighter. On the other hand, if processing content is not cancelled by the user, then the CPU 2 applies the processing for raising lightness to the image processing target area of the image 40A that has been subjected to the "AFTERIMAGE" processing as illustrated in FIG. 6.

The number of implementations stipulating the processing that has been implemented is increased in the image processing table by the CPU 2 (step 33). In the example shown in FIG. 2, the processing of the processing content corresponding to the tag information "RUN" is "AFTERIMAGE", whereas processing content entered by the user is "RAISE LIGHTNESS". In the image processing table shown in FIG. 2, therefore, the processing content "RAISE LIGHTNESS" is added on in correspondence with the tag information "RUN". As a result, the image processing table is updated by the CPU 2 (image processing table updating unit).

FIG. 8 illustrates the image processing table that is the result of adding on the processing content "RAISE LIGHTNESS" in correspondence with the tag information "RUN".

The new processing content "RAISE LIGHTNESS" corresponding to the tag information "RUN" has been stored in the image processing table and tag specifying information (second tag specifying information) "ID6" has been appended. Further, "2" has been appended as the number of implementations. In a case where the processing of processing content that has been stipulated in correspondence with tag information has been implemented, the number of implementations is increased by just 1. However, in a case where the processing of processing content entered by the user has been implemented, the number of implementations is increased by 2 by the CPU 2 (second implementation-count increasing unit) (the increase in count by the second implementation-count increasing unit is larger than the increase in count by the first implementation-count increasing unit). The reason for this is to cause user preference to be reflected in the image processing table. Of course, the number of implementations of tag information corresponding to processing of processing content entered by the user may also be increased by the same amount as number of implementations in a case where the processing of processing content stipulated in correspondence with tag information has been implemented.

In the foregoing embodiment, an image that has been subjected to processing is restored to the image that prevailed before the processing by applying a processing cancellation command to the image processing apparatus 1. However, even if a processing cancellation command is not applied to the image processing apparatus 1, an arrangement may be adopted so that, in a case where the content of processing entered by the user after the execution of processing corresponding to tag information has been accepted by the image processing apparatus 1, the already executed processing is cancelled by the CPU 2 (processing cancellation unit) on the grounds that the user does not like the processing already executed by the image processing apparatus 1. Further, in a case where the content of processing entered by the user after the execution of processing corresponding to tag information has been accepted by the image processing apparatus 1, the number of implementations that has been increased may be decreased by the CPU 2 (implementation-count decreasing unit), as illustrated at step 31. However, the number of implementations need not be decreased.

Assume a case where processing content corresponding to tag information (second tag specifying information) that matches the tag information (first tag specifying information) of an image is read from the image processing table from among the items of tag specifying information (second tag specifying information) stipulated in the image processing table. It may be arranged so that if, in such case, multiple items of processing content corresponding to tag specifying information (second tag specifying information) that matches the same tag information (first tag specifying information) exist in the image processing table, then processing content for which the number of implementations is large is acquired and the processing stipulated by the acquired processing content is implemented with respect to the image. In a case where "SORROW" has been acquired as the tag information (first tag specifying information) of an image, as shown in FIG. 2, the items of tag specifying information (second tag specifying information) that match the tag information "SORROW" are ID4 and ID5, i.e., multiple. The items of processing content corresponding to the tag specifying information ID4 and ID5 are "LOWER LIGHTNESS" and "AFTERIMAGE", i.e., multiple. The number of implementations of "LOWER LIGHTNESS" is 2, and the number of implementations of "AFTERIMAGE" is 1. Therefore, in a case where "SORROW" has been acquired as the tag information, "LOWER LIGHTNESS" processing having the larger number of implementations is applied to the image.

Further, assume a case where processing content corresponding to tag specifying information (second tag specifying information) that matches the tag information (first tag specifying information) of an image is read from the image processing table from among the items of tag specifying information (second tag specifying information) stipulated in the image processing table. It may be arranged so that if, in such case, multiple items of processing content corresponding to tag specifying information (second tag specifying information) that matches the same tag information (first tag specifying information) exist in the image processing table, then the processing content having the latest update date and time (the second tag information having the latest update date and time) from among the multiple items of processing content is read and the processing stipulated by the read processing content is implemented with respect to the image. For example, in a case where "SORROW" has been acquired as the tag information (first tag specifying information) of an image, as shown in FIG. 2, the items of processing content corresponding to the tag information "SORROW" of the tag specifying information (second tag specifying information) matching the tag information (first tag information) from among the items of tag specifying information (second tag information) that have been stored in the image processing table are "LOWER LIGHTNESS" and "AFTERIMAGE", i.e., multiple. In a case where the update date and time of "AFTERIMAGE" is later than that of "LOWER LIGHTNESS", the image is subjected to the "LOWER LIGHTNESS" processing, which has the later update date and time (ID4 is acquired as the tag specifying information).

In a case where tag information (first tag information) is acquired by image analysis in the processing of step 22 in FIG. 3 and tag specifying information (second tag information) that matches the acquired tag information has not been stored in the image processing table, the new tag information that has been acquired and tag specifying information (second tag information) corresponding to the acquired tag information are stored in the image processing table and processing corresponding to the processing content that corresponds to the new tag information is designated by the user. The designated processing content is stored in the image processing table. In such case, it is preferred that the new tag information that will be stored in the image processing table be decided in the following order: expression in the form of a verb, expression in the form of an adjective and expression in the form of a noun. For example, if, in a case where the tag information "RUN" is not included in the image processing table shown in FIG. 2 or FIG. 8, expression in the form of the verb "RUN", expression in the form of the adjective "FAST" and expression in the form of the noun "WORKOUT" are all obtained as a result of image analysis from the image 40 shown in FIG. 5, then expression in the form of the verb "RUN" is stored in the image processing table anew as tag information. In a case where expression in the form of the verb "RUN" was not obtained, expression in the form of the adjective "FAST" is stored in the image processing table anew as tag information. In a case where neither expression in the form of the verb "RUN" nor expression in the form of the adjective "FAST" was obtained, expression in the form of the noun "WORKOUT" is stored in the image processing table anew as tag information. In a case where, instead of execution of image analysis, the user inputs tag information [tag specifying information (second tag specifying information) also is appended in correspondence with the tag information], tag information expressed in the form of a verb understood to be widely used is stored in the image processing table beforehand. By referring to the table at the time of input, it can be expected that tag information expressed in the form of verbs will increase in the image processing table.

Figure 9:
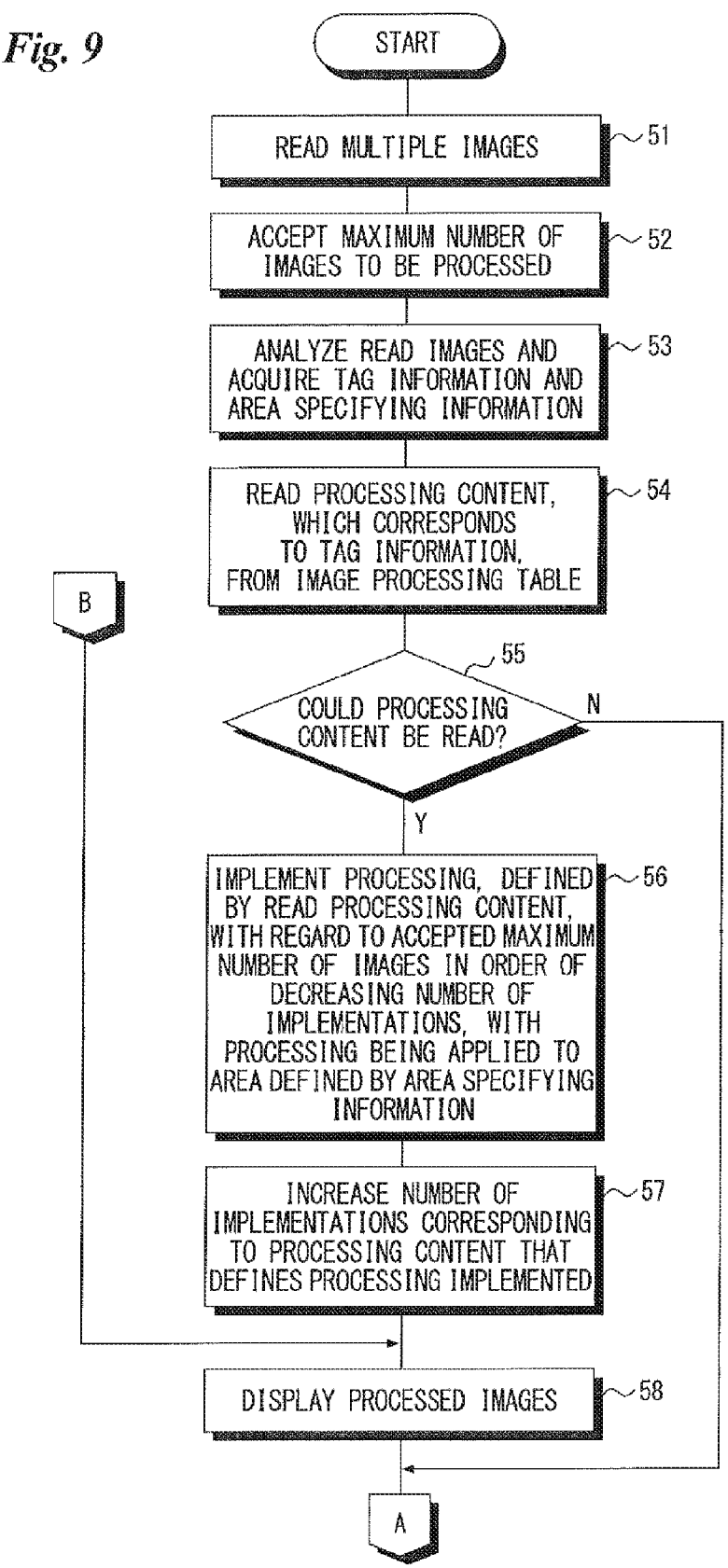
FIG. 9 is a flowchart illustrating processing executed by the image processing apparatus.
Figure 10:
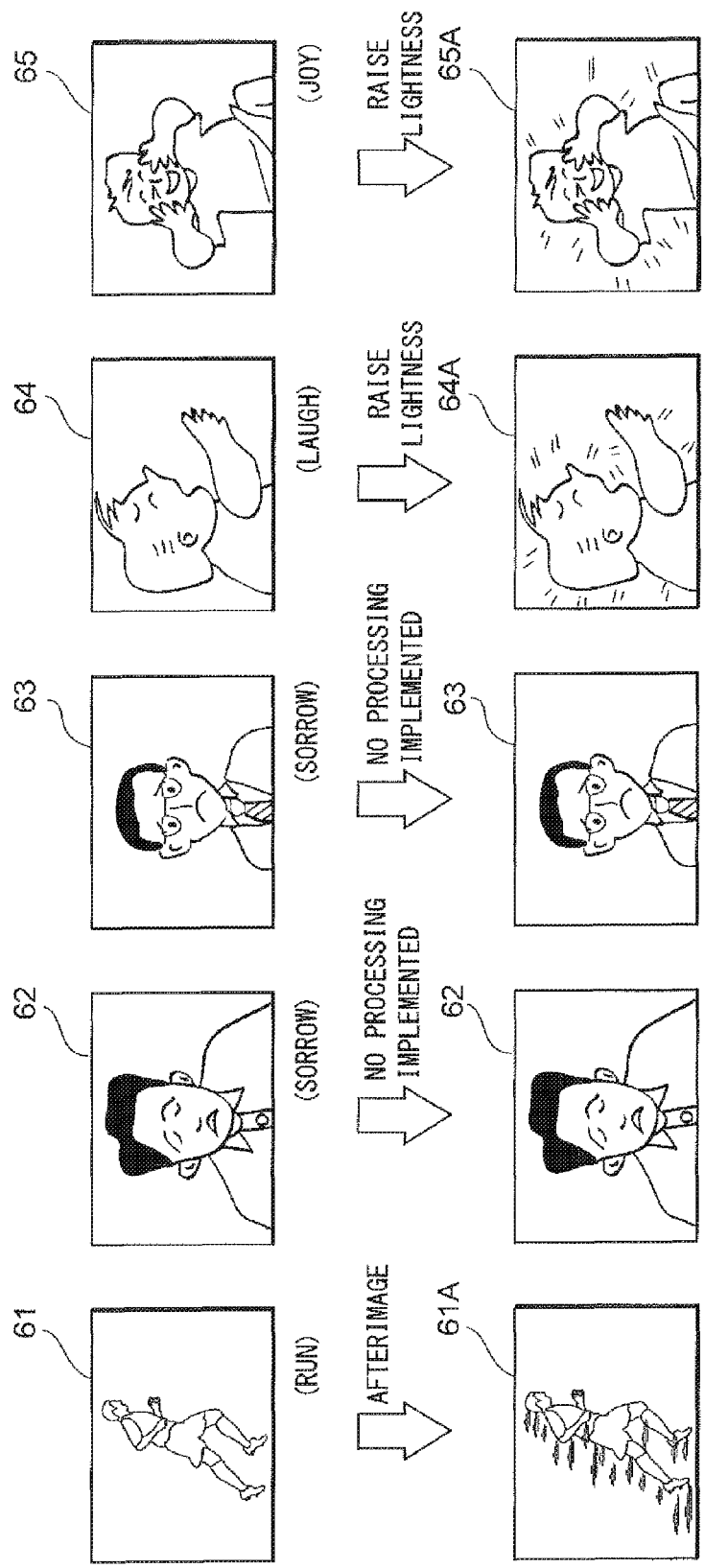
FIG. 10 shows examples of images.

FIG. 9 is a flowchart illustrating a portion of the processing executed by the image processing apparatus 1 and corresponds to the flowchart shown in FIG. 3. The processing of the flowchart shown in FIG. 9 is executed in place of the processing of the flowchart shown in FIG. 3. FIG. 10 is an example of a plurality of images.

In a case where multiple image combining areas have been defined in a single template, images are combined with respective ones of the image combining areas. A plurality of images, therefore, are prepared. In such case, instead of applying image processing to all of the multiple images to be combined with the multiple image combining areas, often image processing is applied to only one, two or more of the images among the multiple images and is not applied to the other images. In the embodiment shown in FIGS. 9 and 10, images to undergo image processing are decided from among multiple images and the images decided are subjected to image processing.

Multiple images are read by the image processing apparatus 1 from among images that have been stored on the memory card 8 (step 51) and image data representing the read multiple images is stored in the memory 4 temporarily. Further, the maximum number of images to undergo image processing is input from the input unit 9 (maximum-number acceptance unit) and the maximum number of images is accepted by the image processing apparatus 1 (step 52). In this embodiment, it is assumed that five images from an image 61 to an image 65 have been input to the image processing apparatus 1 and that "3" has been entered as the maximum number of images to undergo image processing, as illustrated in FIG. 10.

The CPU 2 analyzes each of the read plurality of images 61 to 65 and acquires tag information (first tag specifying information) and area specifying information (step 53). It is assumed that "RUN", "SORROW", "SORROW", "LAUGH" and "JOY" have been acquired as tag information (first tag specifying information) from the images 61, 62, 63, 64 and 65, respectively. Processing content corresponding to tag specifying information (second tag specifying information) [which is from the tag specifying information (second tag specifying information) contained in the image processing table] that matches tag specifying information (first tag specifying information) corresponding to the tag information acquired from the images is read from the image processing table (assumed to be the image processing table shown in FIG. 2) (step 54). "AFTERIMAGE", "LOWER LIGHTNESS", "RAISE LIGHTNESS" and "RAISE LIGHTNESS", respectively, are read as the processing of processing content corresponding to the items of tag specifying information (second tag specifying information) ID1, ID4, ID5, ID3 and ID2 that match the tag information "RUN", "SORROW", "LAUGH" and "JOY" read from the images. Both "LOWER LIGHTNESS" and "AFTERIMAGE" exist as processing of the processing content corresponding to the items of tag specifying information (second tag specifying information) ID4 and ID5 that match the tag information "SORROW" read from the image. However, "LOWER LIGHTNESS", which has the high number of implementations, is read from the image processing table as the processing content corresponding to the tag specifying information (second tag specifying information) ID4 that matches the tag information "SORROW" read from the image.

When the processing content is read from the image processing table ("YES" at step 55), the processing defined by the read processing content is implemented by the CPU 2 with respect to the accepted maximum number of images and is applied in order of decreasing number of implementations to the areas thereof defined by the area specifying information (step 56). As shown in FIG. 2, the numbers of implementations of the tag information "RUN", "JOY", "LAUGH", "SORROW" and "SORROW" are "5", "4", "3", "2" and "1", respectively. Therefore, the CPU 2 implements the "AFTERIMAGE", "RAISE LIGHTNESS" and "RAISE LIGHTNESS" processing with regard to the images 61, 64 and 65 having the respective items of tag information "RUN", "JOY" and "LAUGH" corresponding to the three higher-order numbers of implementations that correspond to the maximum number of images ("3") that has been input (step 56). As a result, an image 61A is obtained by subjecting image 61 to afterimage processing, an image 64A is obtained by subjecting image 64 to processing for raising lightness, and an image 65A is obtained by subjecting image 65 to processing for raising lightness. Thereafter, the numbers of implementations corresponding to the executed items of processing content are increased by the CPU 2 (step 57). The images obtained by this image processing are displayed (step 58). Control then proceeds to the processing indicated at step 28 shown in FIG. 4.

An arrangement may be adopted in which the apparatus communicates with a client computer, smartphone or the like, image data is transmitted from the client computer or the like and the transmitted image data is received by the image processing apparatus 1. Image data representing an image that has been subjected to image processing would be transmitted from the image processing apparatus 1 to the client computer and the image data resulting from the image processing would be displayed on the display screen of a display device connected to the client computer. In this case, the transmission of the image data representing the processed image corresponds to image display control.

The image processing table may be created on a per-user basis or in multiple-user units. An arrangement may be adopted in which the image processing table stipulates processing content that corresponds to tag information and is subsequently updated as necessary to increase the items of processing content, or in which the items of processing content are increased from a state in which absolutely no processing content has been stipulated. Further, it may be arranged so that, in a case where area specifying information is not read or an area cannot be defined, image processing is applied to the entire image.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   a tag specifying information acquisition unit for acquiring first tag specifying information that specifies tag information of an image;
   a first image processing unit for acquiring, from among items of second tag specifying information from an image processing table that stipulates a plurality of corresponding relationships each of which is a corresponding relationship among three items which are second tag specifying information, processing content that defines processing to be applied to the image and number of implementations of processing of the processing content, second tag specifying information that matches the first tag specifying information acquired by said tag specifying information acquisition unit, reading processing content, which corresponds to the acquired second tag specifying information, from the image processing table, and subjecting the image to processing defined by the read processing content; and a first implementation-count increasing unit for increasing, from among the numbers of implementations stipulated in the image processing table, the number of implementations corresponding to the processing content that defines the processing implemented by said first image processing unit.

2. The apparatus according to claim 1, further comprising a display control unit for displaying the image, which has been subjected to processing by said first image processing unit, on a display screen of a display device.

3. The apparatus according to claim 2, further comprising:
a processing content acceptance unit for accepting the processing content from a user;
a second image processing unit for subjecting the image to the processing content accepted by said processing content acceptance unit; and
a second implementation-count increasing unit for increasing, from among the numbers of implementations stipulated in the image processing table, the number of implementations corresponding to the processing content that defines the processing executed by said second image processing unit.

4. The apparatus according to claim 3, wherein said second implementation-count increasing unit increases the number of implementations by a count greater than that performed by said first implementation-count increasing unit.

5. The apparatus according to claim 3, further comprising:
a processing cancellation unit for restoring the image, which has been subjected to processing by said first image processing unit, to the image that prevailed before implementation of this processing, in response to acceptance of the processing content by said processing content acceptance unit; and
an implementation-count decreasing unit for decreasing number of implementations corresponding to processing content that defines processing that was applied to the image restored by said processing cancellation unit to the image that prevailed before implementation of processing.

6. The apparatus according to claim 3, further comprising an image processing table updating unit which, in a case where processing content accepted by said processing content acceptance unit has not been stipulated in the image processing table, is for stipulating the accepted processing content in the image processing table in correspondence with new second tag specifying information.

7. The apparatus according to claim 6, wherein tag information specified by the new second tag specifying information is stipulated in the following order: expression in the form of a verb, expression in the form of an adjective, and expression in the form of a noun.

8. The apparatus according to claim 1, wherein in a case where the image processing table contains multiple items of processing content corresponding to the acquired second tag specifying information, said first image processing unit acquires processing content having a high number of implementations and subjects the image to processing defined by the acquired processing content.

9. The apparatus according to claim 1, wherein said tag specifying information acquisition unit acquires area specifying information, which specifies an area to be subjected to processing defined by the processing content, in correspondence with the first tag specifying information; and
said first image processing unit subjects the image to the processing defined by the read processing content, this processing being applied to the area specified by the area specifying information.

10. The apparatus according to claim 1, wherein in a case where the second tag specifying information that matches the acquired first tag specifying information could not be acquired from the image processing table, said processing content acceptance unit accepts the processing content.

11. The apparatus according to claim 1, further comprising a maximum-number acceptance unit for accepting input of a maximum number of images, which are to be subjected to the processing defined by the processing content, from among a plurality of images;
wherein, from among items of first tag specifying information acquired by said tag specifying information acquisition unit with regard to each of the plurality of images, said first image processing unit subjects the maximum number of images that have been input from said maximum-number input unit to processing, which is defined by the read processing content from among the multiple items of processing content that correspond to multiple items of second tag specifying information, in order of decreasing number of implementations.

12. The apparatus according to claim 1, wherein in a case where the image processing table contains multiple items of processing content corresponding to second tag information, which matches the first tag specifying information, from among the items of second tag information, said first image processing unit reads processing content having the latest update date and time from among the multiple items of processing content.

13. An image processing method comprising steps of:
a tag specifying information acquisition unit acquiring first tag specifying information that specifies tag information of an image;
a first image processing unit acquiring, from among items of second tag specifying information from an image processing table that stipulates a plurality of corresponding relationships each of which is a corresponding relationship among three items which are second tag specifying information, processing content that defines processing to be applied to the image and number of implementations of processing of the processing content, second tag specifying information that matches the first tag specifying information acquired by the tag specifying information acquisition unit, reading processing content, which corresponds to the acquired second tag specifying information, from the image processing table, and subjecting the image to processing defined by the read processing content; and
a first implementation-count increasing unit increasing, from among the numbers of implementations stipulated in the image processing table, the number of implementations corresponding to the processing content that defines the processing implemented by the first image processing unit.

14. A non-transitory recording medium storing a computer-readable program for controlling the computer of an image processing apparatus so as to:

acquire first tag specifying information that specifies tag information of an image;

acquire, from among items of second tag specifying information from an image processing table that stipulates a plurality of corresponding relationships each of which is a corresponding relationship among three items which are second tag specifying information, processing content that defines processing to be applied to the image and number of implementations of processing of the processing content, second tag specifying information that matches the acquired first tag specifying information, read processing content, which corresponds to the acquired second tag specifying information, from the image processing table, and subjecting the image to processing defined by the read processing content; and increase, from among the numbers of implementations stipulated in the image processing table, the number of implementations corresponding to the processing content that defines the processing implemented.

* * * * *